(12) United States Patent  
Bellessort et al.

(10) Patent No.: US 11,696,014 B2
(45) Date of Patent: Jul. 4, 2023

(54) METHOD AND SYSTEM FOR IMPROVING SETTINGS OF A CAMERA IMAGES OF WHICH ARE USED TO PERFORM A PARTICULAR TASK

(71) Applicant: Milestone Systems A/S, Brøndby (DK)

(72) Inventors: Romain Bellessort, Rennes (FR); Tristan Halna Du Fretay, Langan (FR)

(73) Assignee: Milestone Systems A/S, Brøndby (DK)

( * ) Notice: Subject to any disclaimer, the term of this patent is extended or adjusted under 35 U.S.C. 154(b) by 58 days.

(21) Appl. No.: 17/606,700

(22) PCT Filed: Aug. 28, 2020

(86) PCT No.: PCT/EP2020/074153
§ 371 (c)(1),
(2) Date: Oct. 26, 2021

(87) PCT Pub. No.: WO2021/043695
PCT Pub. Date: Mar. 11, 2021

(65) Prior Publication Data
US 2022/0159172 A1    May 19, 2022

(30) Foreign Application Priority Data
Sep. 2, 2019  (GB) ...................................... 1912590

(51) Int. Cl.
*H04N 23/62* (2023.01)
*H04N 23/617* (2023.01)
*H04N 23/661* (2023.01)

(52) U.S. Cl.
CPC .......... *H04N 23/62* (2023.01); *H04N 23/617* (2023.01); *H04N 23/661* (2023.01)

(58) Field of Classification Search
CPC .... H04N 23/62; H04N 23/617; H04N 23/661; H04N 7/18; H04N 23/66
See application file for complete search history.

(56) References Cited

U.S. PATENT DOCUMENTS 5,479,206 A    12/1995 Ueno et al.
7,050,042 B2 *  5/2006 Watanabe ............ H04N 23/661
                                                348/E5.042

(Continued)

FOREIGN PATENT DOCUMENTS

GB    2564387 A    1/2019
GB    2570449 A    7/2019

*Primary Examiner* — Timothy J Henn
(74) *Attorney, Agent, or Firm* — Canon U.S.A., Inc. IP Division

(57) ABSTRACT

A method for improving settings of a camera, the method comprising: obtaining a first set of setting parameters that are adjustable by an auto-setting algorithm, the setting parameters of the first set being set as a function of a task to be performed based on images obtained from the camera; obtaining a second set of setting parameters, the setting parameters of the second set being setting parameters of the camera, values of which are settable remotely from the camera; determining, as a function of the first and second sets of setting parameters, whether the auto-setting algorithm and the camera are compatible to perform the task; and if the auto-setting algorithm and the camera are compatible to perform the task, executing the auto-setting algorithm to adjust values of setting parameters of the camera.

20 Claims, 5 Drawing Sheets

(56) References Cited

U.S. PATENT DOCUMENTS

| | | | |
|---|---|---|---|
| 10,270,966 B2 * | 4/2019 | Choe | H04N 23/667 |
| 2008/0246848 A1 | 10/2008 | Tsubaki et al. | |
| 2015/0207977 A1 * | 7/2015 | Cho | H04N 7/181 |
| | | | 348/207.11 |
| 2018/0063422 A1 * | 3/2018 | Liu | H04N 23/90 |
| 2019/0230277 A1 | 7/2019 | Visa et al. | |

* cited by examiner

METHOD AND SYSTEM FOR IMPROVING SETTINGS OF A CAMERA IMAGES OF WHICH ARE USED TO PERFORM A PARTICULAR TASK

CROSS-REFERENCE TO RELATED APPLICATIONS

This application is the National Phase application of PCT Application No. PCT/EP2020/074153, filed on Aug. 28, 2020 and titled "METHOD AND SYSTEM FOR IMPROVING SETTINGS OF A CAMERA IMAGES OF WHICH ARE USED TO PERFORM A PARTICULAR TASK". This application claims the benefit under 35 U.S.C. § 119(a)-(d) of United Kingdom Patent Application No. 1912590.5, filed on Sep. 2, 2019. The above cited patent applications are incorporated herein by reference in their entirety.

FIELD OF THE INVENTION

The present invention relates to the technical field of setting cameras, for example in distributed camera systems, in particular for improving settings of a camera, images of which are used to perform a particular task (or to fulfil a particular mission).

BACKGROUND OF THE INVENTION

Video surveillance is currently a fast-growing market tending to become increasingly widespread for ubiquitous applications. It can be used today in numerous areas such as crime prevention, private and public areas for security purposes, abnormal event detection, traffic monitoring, customer behaviour, or general data gathering.

Each camera of a video surveillance system is typically assigned to a particular task or a particular mission. Such a task or mission may be, for example, vehicle registration plate recognition, face recognition, or machine monitoring. Naturally, several cameras of different types or located at different locations may be assigned to the same task. The latter can be conducted by a user or may be automatized or partially automatized, for example using video content analysis (VCA) modules.

In order to perform a particular task efficiently, the type of the cameras to be used should be selected properly and the cameras should be set correctly. For example, the aperture, the speed, and the gain as well the focal length, the focus, the depth-of-field, and the white balance are setting parameters of the camera for which the values are to be chosen properly so that the acquired images make it possible to perform the task efficiently.

However, configuring or setting a camera, that is to say adjusting the values of the setting parameters, may take a significant amount of time. Indeed, since optimal settings for particular conditions, for example particular lightning conditions, may appear to be poor settings in other conditions, a trade-off is to be found so that the settings provide good results in the different possible conditions. Therefore, configuring a single camera may take several hours to obtain settings that may provide good results in most conditions.

Camera auto-setting technologies enable settings to be determined automatically according to current conditions. They make it possible to reduce the amount of time needed for configuring a camera and to dynamically adjust the values of the setting parameters of a camera. These technologies are generally embedded within the cameras. As a consequence, although they prove to be efficient, they lack flexibility.

Consequently, there is a need to improving settings of cameras, in particular settings of cameras of which images are used to perform a particular task.

SUMMARY OF THE INVENTION

The present invention has been devised to address one or more of the foregoing concerns.

In this context, there is provided a solution for improving settings of cameras images of which are used to perform particular tasks.

According to a first aspect of the invention, there is provided a method for improving settings of a camera, the method comprising:

obtaining a first set of setting parameters that are adjustable by an auto-setting algorithm, the setting parameters of the first set being set as a function of a task to be performed based on images obtained from the camera;

obtaining a second set of setting parameters, the setting parameters of the second set being setting parameters of the camera, values of which are settable remotely from the camera;

determining, as a function of the first and second sets of setting parameters, whether the auto-setting algorithm and the camera are compatible to perform the task; and if the auto-setting algorithm and the camera are compatible to perform the task, executing the auto-setting algorithm to adjust values of setting parameters of the camera.

According to the method of the invention, relevant auto-setting algorithms may be identified by checking the compatibility of each of the auto-setting algorithms with each of the considered cameras (or types of cameras). As a consequence, a relevant auto-setting algorithm may be provided to a user, or to a selection mechanism, to be selected, in order to improve settings of the considered cameras.

Optional features of the invention are further defined in the dependent appended claims.

According to a second aspect of the invention, there is provided a device for improving settings of a remote camera, the device comprising a microprocessor configured for carrying out the steps of:

obtaining a first set of setting parameters that are adjustable by an auto-setting algorithm, the setting parameters of the first set being set as a function of a task to be performed based on images obtained from the remote camera;

obtaining a second set of setting parameters, the setting parameters of the second set being setting parameters of the remote camera, values of which are settable remotely from the remote camera;

determining, as a function of the first and second sets of setting parameters, whether the auto-setting algorithm and the remote camera are compatible to perform the task; and if the auto-setting algorithm and the remote camera are compatible to perform the task, executing the auto-setting algorithm to adjust values of setting parameters of the remote camera.

The second aspect of the present invention has optional features and advantages similar to the first above-mentioned aspect.

At least parts of the methods according to the invention may be computer-implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

According to particular embodiments, settings of a camera are improved by appropriately selecting an auto-setting algorithm for setting the camera, for a particular task to be performed, by verifying that the selected auto-setting algorithm for setting the camera provides the expected results.

To that end, auto-setting algorithms that can be used for setting cameras are identified for a particular task to be performed. Next, the requirements of the identified algorithms regarding camera setting parameters to be controlled are determined and it is checked whether a considered camera supports these requirements. For example, if an auto-setting algorithm needs to control the aperture of a camera, it is verified that the considered camera provides the opportunity to control its aperture. Next, the auto-setting algorithms that may be used for setting the considered camera are provided to a user who may select the one to be used for the task to be performed. Alternatively, one of the algorithms may be selected automatically.

For the sake of illustration, the following examples are directed to setting a camera in a video surveillance system. However, embodiments of the invention are not limited to this context.

Figure 1:
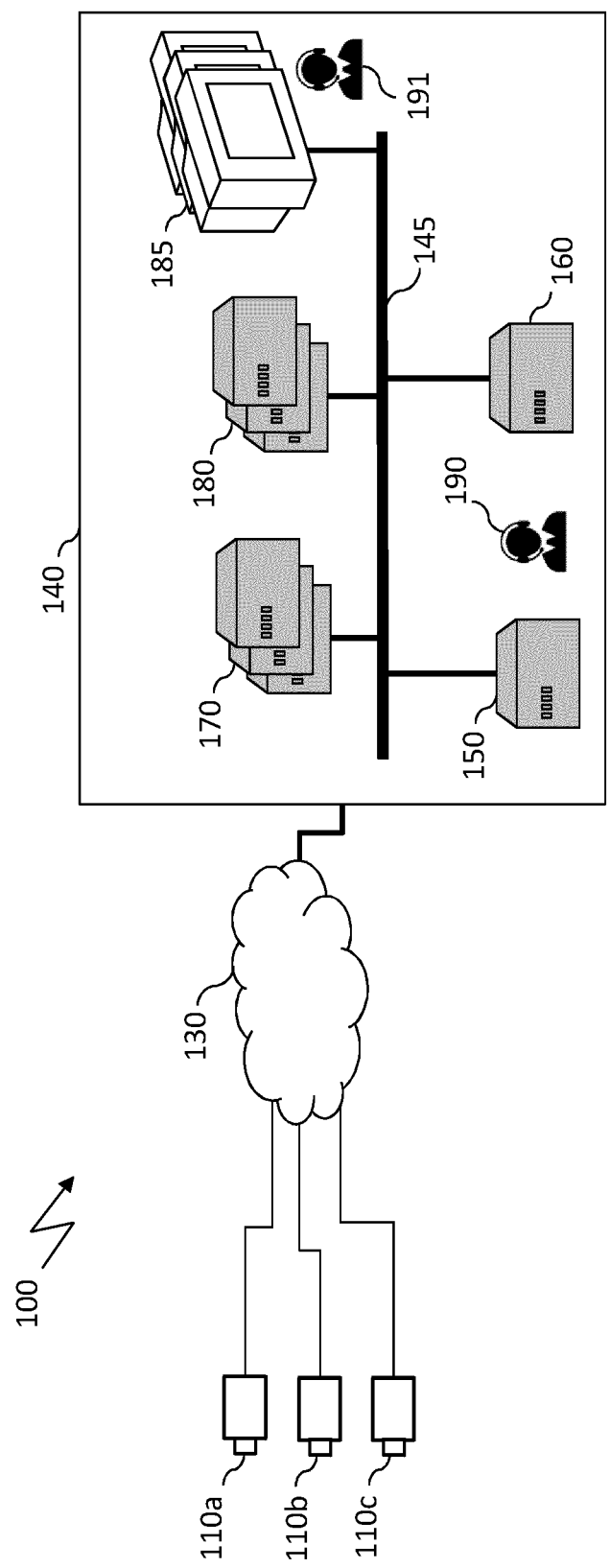
FIG. 1 schematically illustrates an example of a video surveillance system wherein embodiments of the invention may be implemented.

FIG. 1 schematically illustrates an example of a video surveillance system wherein embodiments of the invention may be implemented.

Video surveillance system 100 includes a plurality of network video-cameras denoted 110a, 110b, and 110c, for example network video-cameras of the Internet Protocol (IP) type, generically referred to as IP cameras 110.

Network video-cameras 110, also referred to as source devices, are connected to a central site 140 via a backbone network 130. In a large video surveillance system, backbone network 130 is typically a wide area network (WAN) such as the Internet.

According to the illustrated example, central site 140 comprises a video manager system (VMS) comprising a management server 150 to manage the video surveillance system, an auto-setting server 160 used to perform an automatic setting of the cameras and, if needed, of VCA modules, a set of recording servers 170 configured to store the received video streams, optionally a set of video content analysis module servers 180 configured to analyse the received video streams, and a set of displays 185 configured to display received video streams. All the modules are interconnected via a dedicated infrastructure network 145 that is typically a local area network (LAN), for example a local area network based on Gigabit Ethernet.

Management server 150 may be a device containing a software module that makes it possible to configure, control, and manage the video surveillance system, for example via an administration interface. Such tasks are typically carried out by an administrator (e.g. administrator 190) who is in charge of configuring the overall video surveillance system. In particular, administrator 190 may use management server 150 for setting the cameras, especially for adjusting the values of the setting parameters of the cameras, as described by reference to FIGS. 3 to 8. Management server 150 is described in more detail by reference to FIG. 2.

The set of displays 185 may be used by operators (e.g. operators 191) to watch the video streams corresponding to the scenes shot by the video-cameras of the video surveillance system.

The auto-setting server 160 contains a module for automatically or almost automatically setting parameters of the cameras. As described above, it may also be used for automatically or almost automatically setting parameters of video content analysis modules that may be implemented in video-cameras or in the servers 180.

Figure 2:
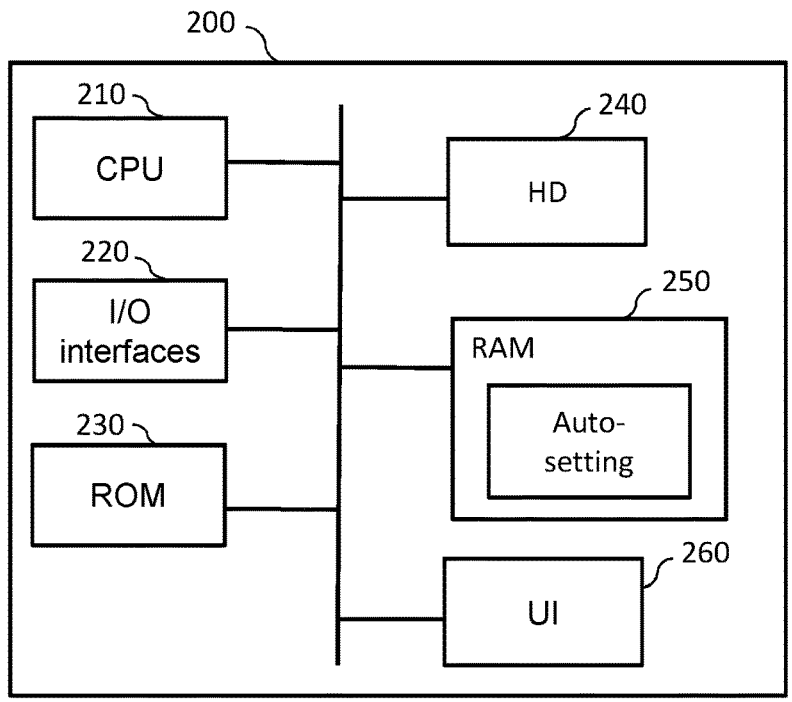
FIG. 2 is a schematic block diagram of a computing device for implementing embodiments of the invention.

FIG. 2 is a schematic block diagram of a computing device for implementing embodiments of the invention. It may be embedded in management server 150 or in auto-setting server 160 described with reference to FIG. 1. It may be used to carry out the steps described by reference to FIGS. 3 to 8.

The computing device 200 comprises a communication bus connected to:

a central processing unit 210, such as a microprocessor, denoted CPU;

an I/O module 220 for receiving data from and sending data to external devices. In particular, it may be used to retrieve images from source devices;

a read only memory 230, denoted ROM, for storing computer programs for implementing embodiments;

a hard disk 240 denoted HD;

a random access memory 250, denoted RAM, for storing the executable code of the method of embodiments of the invention, in particular an auto-setting algorithm, as well as registers adapted to record variables and parameters;

a user interface 260, denoted UI, used to configure input parameters of embodiments of the invention. As mentioned above, an administration user interface may be used by an administrator of the video surveillance system.

The executable code may be stored either in random access memory 250, in hard disk 240, or in a removable digital medium (not represented) such as a disk of a memory card.

The central processing unit 210 is adapted to control and direct the execution of the instructions or portions of software code of the program or programs according to particular embodiments of the invention, which instructions are stored in one of the aforementioned storage means. After powering on, CPU 210 may execute instructions from main RAM memory 250 relating to a software application after those instructions have been loaded, for example, from the program ROM 230 or hard disk 240.

Figure 3:
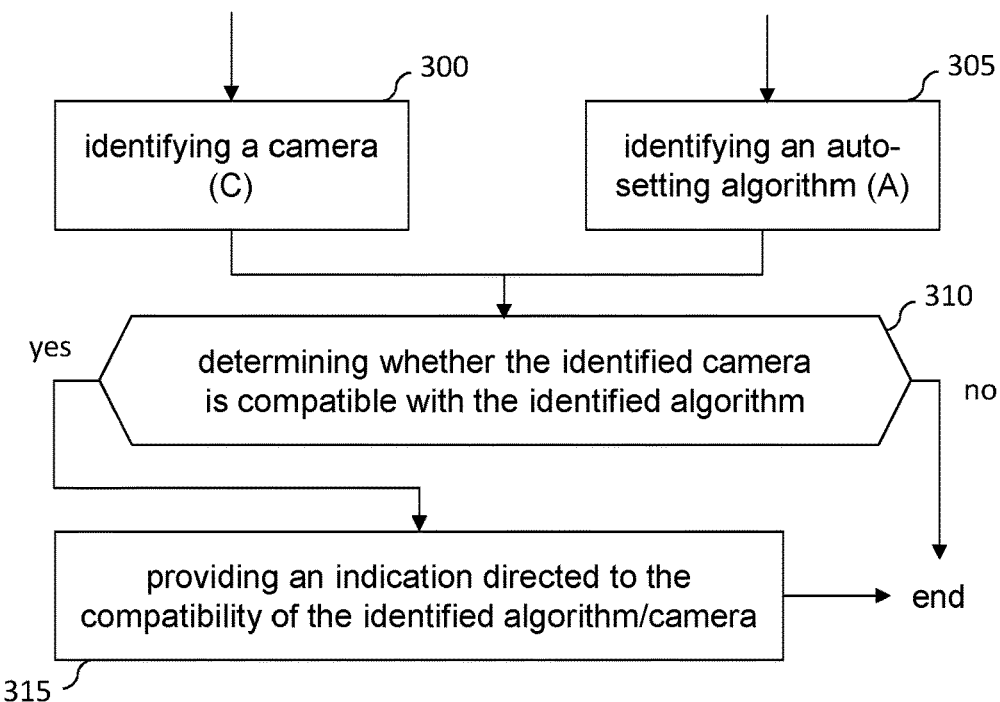
FIG. 3 is a block diagram illustrating an example of steps of a method according to particular embodiments of the invention, for determining whether an auto-setting algorithm may be used to adjust the values of setting parameters of a particular camera for performing a particular task.

FIG. 3 is a block diagram illustrating an example of steps of a method according to particular embodiments of the invention, for determining whether an auto-setting algorithm may be used to adjust the values of setting parameters of a particular camera for performing a particular task, i.e., whether the auto-setting algorithm is compatible with the camera.

As illustrated, a first step (step 300) is directed to identifying a camera, denoted C, that may be used to provide images making it possible to perform a particular task or mission, denoted M, for example to recognize plates or faces or to monitor machinery. It is noted that such a particular task may be conducted by a user or may, at least partially, be computerized, using, for example, video content analytics modules. According to particular embodiments, a mission conducted by a user is considered to be a different mission from the same mission conducted by computer means.

In parallel, before, or after the step of identifying a camera, an auto-setting algorithm for setting a camera or for optimizing the setting of the camera, denoted A, for the particular task to be performed, is identified (step 305). In addition, according to particular embodiments, a list of camera setting parameters, denoted LS_A, that may be controlled by the identified auto-setting algorithm is obtained. Such camera setting parameters may comprise the aperture, the speed, and the gain as well the focal length, the focus, the depth-of-field, and the white balance, and an image encoding level. It is noted that the identified auto-setting algorithm is to be carried out in computer means, for example in a management server or an auto-setting server such as management server 150 and auto-setting server 160 described by reference to FIG. 1, that are distinct from the considered camera (i.e. the identified auto-setting algorithm is not carried out in the considered camera).

According to particular embodiments, each of the setting parameters of the list may be marked as essential or optional. Rules regarding the essential or optimal aspect of the setting parameters may also be stored in relation with the list. Such a rule may indicate that a particular setting parameter is essential but may be optional if another given setting parameter belongs to the list. Such essential and optimal aspects and/or rules may be defined by the one having developed the considered auto-setting algorithm, as a function of the latter.

Alternatively, if an auto-setting algorithm may be carried out with several combinations of setting parameters, one auto-setting algorithm is considered for each combination of setting parameters. For example, if an auto-setting algorithm needs to control the gain and the aperture or the shutter speed, a first auto-setting algorithm is associated with the gain and the aperture and the same auto-setting algorithm, considered as a second auto-setting algorithm, is associated with the gain and the shutter speed. As described hereafter, if several auto-setting algorithms are compatible with a camera, the one which is associated with the greatest number of setting parameters is advantageously selected.

According to particular embodiments, the identified auto-setting algorithm is provided with a "variation model" which gives the expected effects on the images provided by the camera when the values of the setting parameters are changed. Such a variation model may be a list of rules correlating camera setting parameters to one or more image features (that may be represented as an image metric) such as the gain and the noise or the gain and the intensity. For the sake of illustration, such rules may be the following:

if the gain is increased, the noise in the image should also increase; and if the shutter speed is increased, the image intensity should also increase.

Next, based on the obtained list of camera setting parameters that may be controlled by the identified auto-setting algorithm and based on features of the identified camera, for example based on setting parameters of the identified camera that may be controlled remotely, it is determined whether the identified auto-setting algorithm and the identified camera are compatible (step 310), meaning that the corresponding task or mission can be associated with the identified camera. An example of such a determination step is described by reference to FIG. 4.

Next, if the identified auto-setting algorithm and the identified camera are compatible, an indication regarding the compatibility of the identified auto-setting algorithm and of the identified camera is provided so that the identified auto-setting algorithm can be selected by a user or by computer means to set the camera or to optimize its setting (step 315). If the identified auto-setting algorithm is selected, the settings of the camera are dynamically modified by the identified auto-setting algorithm as a function of current conditions, for example as a function of the current lighting conditions.

Still according to particular embodiments, the result directed to the compatibility of the identified camera and of the identified auto-setting algorithm is saved along with a reference of the identified camera so that it can be re-used for similar cameras. Accordingly, if several cameras of the same model are to be considered, the determination of step 310 can be performed only once for a particular pair of a camera model and an auto-setting algorithm.

If the identified auto-setting algorithm and the identified camera are not compatible or after having provided an indication regarding their compatibility, the process illustrated in FIG. 3 ends.

Figure 4:
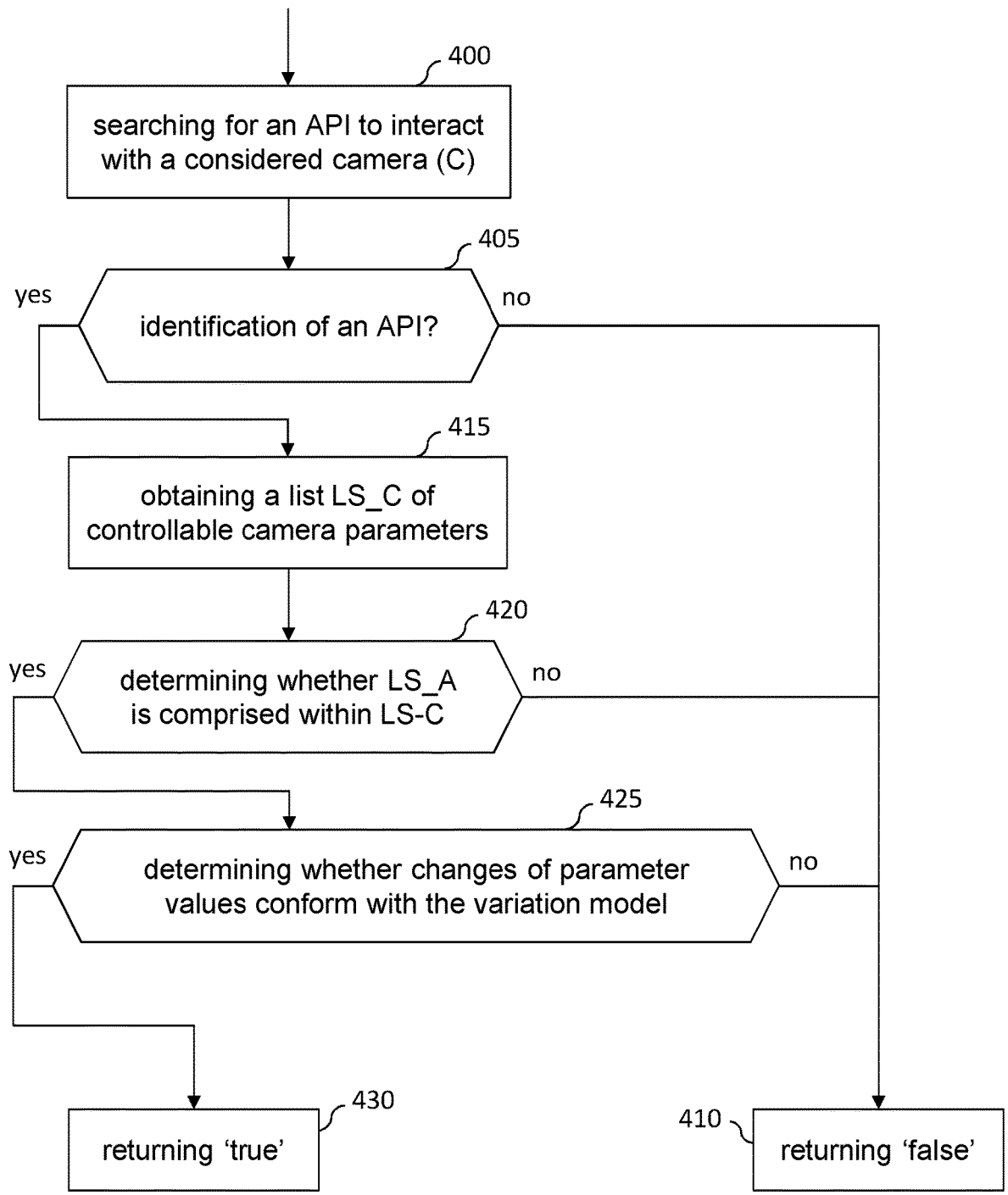
FIG. 4 is a block diagram illustrating an example of steps for determining whether a camera and an auto-setting algorithm are compatible.

FIG. 4 is a block diagram illustrating an example of steps for determining whether a camera and an auto-setting algorithm are compatible.

As illustrated, a first step aims at identifying an API that makes it possible to interact with a considered camera (step 400), it being observed that different cameras may be accessed through different APIs. There are typically two types of APIs: the generic APIs such as the API known as ONVIF, which may be used to interface with different brands of cameras, and the vendor-specific APIs (for example the API known as VAPIX that is specific to cameras manufactured by Axis), which may be used to control only one specific brand of camera. Determining whether an API may be used to interact with a particular camera may be defined by the API itself. For the sake of illustration, an HTTP request may be sent to a considered camera via an API and, depending on the response, it can be determined whether this API is supported or not to interface with the considered camera.

If no API is identified for interacting with the considered camera, a 'false' indication is returned to the application having called the algorithm illustrated in FIG. 4 (step 410).

On the contrary, if an API for interacting with the considered camera has been identified, a list of setting parameters of the considered camera, that may be controlled through the identified API, is obtained (step 415). Indeed, while a camera has generally a huge number of setting parameters, only a few of them can be controlled remotely through an API. According to particular embodiments, the camera setting parameters that may be controlled through the identified API are determined using additional HTTP requests that depend on the identified API. For the sake of illustration, a description of the camera capabilities may be obtained by sending an HTTP request to the considered camera, this description comprising indications regarding the ability to control various camera setting parameters such as the value (or min/max values) of the gain, of the shutter speed, of the iris, and of the encoding level.

It is noted here that there exist setting parameters that are deemed to be controllable through an API but that are not actually controllable.

For example, even though a first setting parameter is identified as being controllable, there may exist a second setting parameter, that is also controllable, that impacts the first setting parameter. For example, if a max gain value is set to an intermediate value, it would not be possible to set the gain to a value that is in the gain value range but that is higher than the max gain value as set (e.g. if the gain value can be set between 0 and 100 and if the max gain value has been set to 50, it would not be possible to set the gain value to 75 and if a user tries to set such a value, he/she may wrongly believe that it has been set). As another example, if the considered camera is in a locked mode where no change can be applied, setting parameters that should be controllable are actually not controllable.

It may also happen that a camera indicates that a setting parameter is controllable while the level of control is actually very limited due, for example, to post-processing carried out by the camera on captured images. For the sake of illustration, some cameras may indicate that the shutter speed is controllable through an API while only a limited range is actually usable because selecting lowest and/or highest values would lead to images of poor quality (e.g. underexposed or overexposed images) that could not be processed by the camera and thus, the cameras prevents use of such extreme values.

Consequently, in addition to checking the self-declared setting parameters, it may be requested to verify that the self-declaration is correct. This can be done by changing the values of some setting parameters and evaluating the impact of these changes on the captured images. As an example, it may be checked that when the value of the shutter speed or of the gain is increased, the image intensity also increases (intensity may be defined as the sum of the luminance values for each channel of an RGB image, typically ranging from 0 to 765 when considering that each channel ranges from 0 to 255) or that image intensity does not decrease by more than 10% when the value of shutter speed is slightly increased, even when contrast is very low.

Turning back to FIG. 4, after having obtained the list of setting parameters of the considered camera that may be controlled through the identified API, it is checked whether the setting parameters required by the considered auto-setting algorithm are comprised within this list (step 420), that is to say whether the list LS_A is comprised within the list LS_C.

If all the setting parameters required by the considered auto-setting algorithm are not comprised within the list of setting parameters of the considered camera that may be controlled through the identified API, a 'false' indication is returned to the application having called the algorithm illustrated in FIG. 4 (step 410).

On the contrary, if all the setting parameters required by the considered auto-setting algorithm are comprised within the list of setting parameters of the considered camera that may be controlled through the identified API, it is determined whether a change of value of a setting parameter impacts an image obtained from the considered camera in a way that conforms with the variation model of the considered auto-setting algorithm (step 425). This step is further described in reference to FIG. 5.

If it is determined that a change of value of a setting parameter impacts an image obtained from the considered camera in a way that conforms with the variation model of the considered auto-setting algorithm, it is accepted that the considered auto-setting algorithm is compatible with the considered camera. As a consequence, a 'true' indication is returned to the application having called the algorithm illustrated in FIG. 4 (step 430). Otherwise, a 'false' indication is returned to this application (step 410).

According to particular embodiments, if more than one API can be used to interact with a particular camera (step 400), for example a generic API and a vendor-specific API, the steps described by reference to FIG. 4 may be carried out for each of the identified APIs. Then, if more than one API leads to the 'true' indication (step 430), any one of these APIs may be selected.

It is noted that instead of determining whether setting parameters that are required by a considered auto-setting algorithm (that is adapted to perform a particular task) are controllable in a considered camera through an API, it is possible to firstly determine the setting parameters of a considered camera that can be controlled via an API, and then to determine whether there exists an auto-setting algorithm (belonging to a set of algorithms adapted to perform the particular task) whose required setting parameters are a subset of the ones of the considered camera that are controllable through an API.

Figures 5, 6A, 6B:
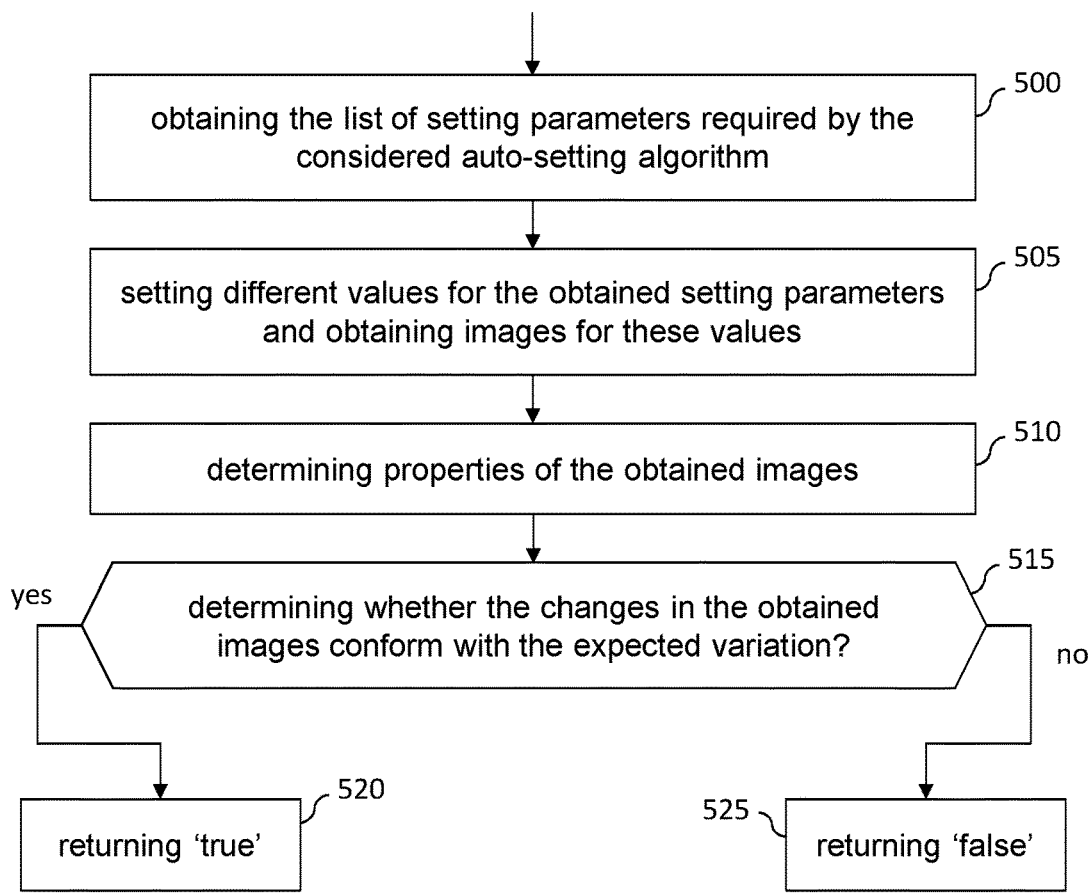
FIG. 5 is a block diagram illustrating an example of steps for determining whether a change of values of setting parameters of a considered camera has an expected impact on images provided by this camera, according to the variation model of a considered auto-setting algorithm.
FIGS. 6a and 6b illustrate two examples of the behavior of a camera when the values of the gain and of the shutter speed are modified.

FIG. 5 is a block diagram illustrating an example of steps for determining whether a change of values in setting parameters of a considered camera has an expected impact on images provided by this camera, according to the variation model of a considered auto-setting algorithm.

As illustrated, a first step aims at obtaining the list of the setting parameters that are required by the considered auto-setting algorithm (step 500).

Next, a set of different values is determined for each of the setting parameters, the considered camera is set according to each of the combinations provided by the determined values, and one or more images are obtained for each combination (step 505).

It is noted that values of the setting parameters are typically determined by the API that is used for interacting with the considered camera, according to the properties of the latter. For example, for a particular camera and a particular API, the gain value may be an integer ranging from 0 to 100 while for another camera and another API, the value of the gain may be of the form 1.5*k, where k is an integer ranging from 0 to 40. Still for the sake of illustration, the shutter values may be given in seconds and may be of the form 125E-6*2^j seconds, where 125E-6 corresponds to 125 microseconds and j is an integer ranging from 0 to 14. Therefore, according to this example, the shutter speed varies from 125 microseconds to about 2 seconds when j varies from 0 to 14.

According to particular embodiments, the ranges of values of the setting parameters are sampled to obtain a subset of possible values. For the sake of illustration, one value out of five may be selected. Based on the selected values, all the combinations of sampled values can be set. For example if the setting parameters comprise only the gain and the shutter speed, each sampled gain value is combined with each sampled shutter speed value.

Each combination is used to set the considered camera and, for each combination, at least one image is obtained.

Next, the variation model associated with the considered auto-setting algorithm is obtained in order to determine the relevant features of the obtained images to be used, that is to say the features making it possible to determine whether the behavior of the considered camera when values of the setting parameters are changed conform with the variation model. Such features may be, for example, the intensity, the contrast, and/or the noise of the images. These features are measured for each of the obtained images (step 510), that is to say for each combination of sampled setting parameter values. This makes it possible to associate at least one measurement value with a combination of setting parameter values, making it possible to determine how the measurements change when the settings values change.

Next, the behavior of the considered camera when the values of the setting parameters change is compared with the expected change as defined by the variation model of the considered auto-setting algorithm (step 515).

If the behavior of the considered camera, when the values of the setting parameters change, conforms with the expected change as defined by the variation model of the considered auto-setting algorithm, a 'true' indication is returned to the application having called the algorithm illustrated in FIG. 5 (step 520). Otherwise, a 'false' indication is returned to this application (step 425).

It is noted that the number of values corresponding to one setting parameter, that are used to determine the behavior of the considered camera, as well as the values themselves, are determined as a trade-off between the accuracy and the time spent doing measurements. Indeed, while behavior can be determined more accurately by increasing the number of values of the setting parameters, increasing such a number of values leads to increasing the time needed for setting the camera and for obtaining images. This is due, in particular, to the fact that it is generally needed to wait a few seconds before an image stabilizes after modifying the setting.

FIGS. 6*a* and 6*b* illustrate two examples of the behavior of a camera when the values of the gain and of the shutter speed are modified. More precisely, FIGS. 6*a* and 6*b* provide the intensity of images obtained with different settings of gain and shutter speed.

According to these examples, images are obtained for four different values of shutter speed (the value of the shutter speed increasing from left to right) and for three different values of gain (the value of the gain increasing from top to bottom). Therefore, twelve measurements have been made. If it is assumed that obtaining one image requires five seconds (and that measurement is carried out in concurrent operation time), this means that it takes roughly one minute to determine whether the behavior of the camera conforms with the expected evolution. Depending on the context (e.g. depending on the customer expectations and needs), this may or may not be acceptable. According to particular embodiments, a user may define a duration time for analyzing the behavior of a camera, such a duration time being used to determine the number of values of the setting parameters based on the time needed to obtain (and/or process) one image.

For the sake of illustration, it is assumed that the variation model associated with the considered auto-setting algorithm is defined by the following rules:
  the intensity of the obtained images increases when the value of the shutter speed increases; and
  the intensity of the obtained images increases when the value of the gain increases.

Considering such a variation model, it can be concluded that the behavior of a camera as represented in FIG. 6*a* conforms with the expected change since the intensity of the image given in FIG. 6*a* increases with both the shutter speed and the gain.

This is not the case for the example illustrated in FIG. 6*b* wherein the intensity does not always increase with the shutter speed (e.g. in the first line, the $4^{th}$ intensity value is lower than the $3^{rd}$ one, which was obtained with a lower shutter speed value) and wherein the intensity does not always increase with the gain (e.g. in the $4^{th}$ column, the $2^{nd}$ intensity value is lower than the $1^{st}$ one, which was obtained with a higher gain value). Therefore, according to the behavior illustrated in FIG. 6*b* and the variation model described above, it can be concluded that the behavior of the camera does not conform with the expected evolution.

However, considering another variation model, it can be concluded that the behavior of the camera conforms with the expected evolution. For example, by considering the following variation model, one can conclude that the behavior of the camera conforms with the expected evolution:
  the intensity of the obtained images increases or remains within a 5% range compared to a previous value when the value of the shutter speed increases; and
  the intensity of the obtained images increases or remains within a 5% range compared to a previous value when the value of the gain increases.

Figure 7:
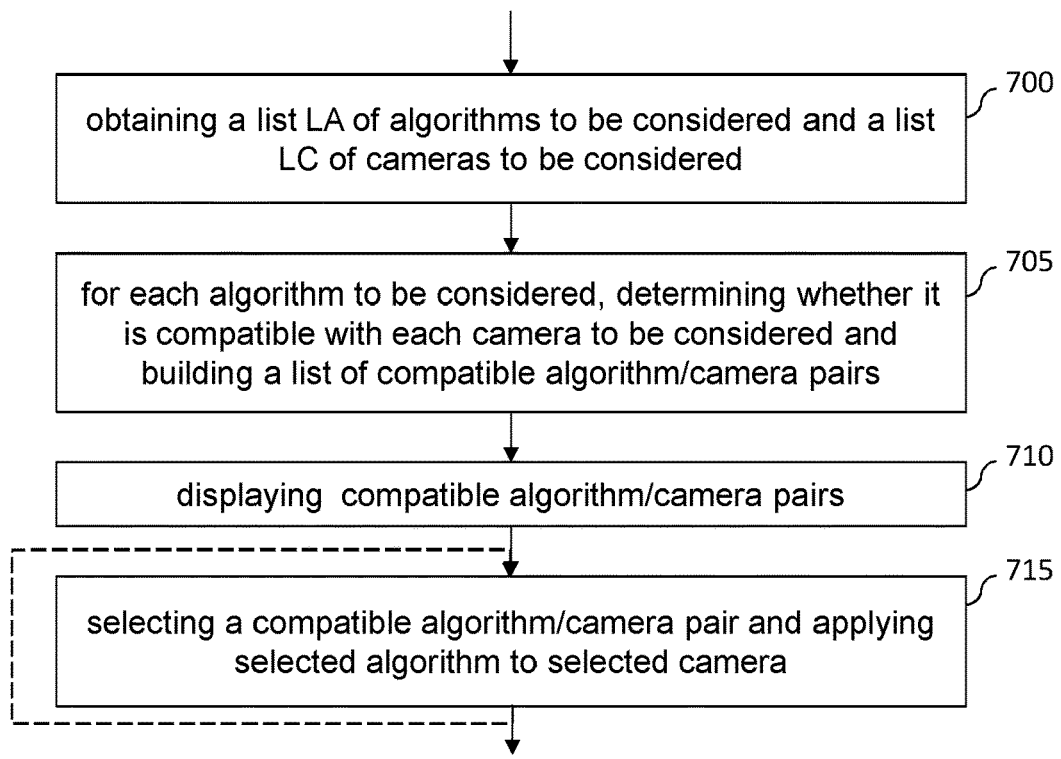
FIG. 7 is a block diagram illustrating a first example of steps of a method for assigning auto-setting algorithms to cameras.

FIG. 7 is a block diagram illustrating a first example of steps of a method for assigning auto-setting algorithms to cameras.

As illustrated, a first step is directed to obtaining a list of auto-setting algorithms to be considered, denoted LA, and a list of cameras to be considered, denoted LC (step 700).

Next, it is determined, for each auto-setting algorithm of the list of auto-setting algorithms to be considered and for each camera of the list of cameras to be considered, whether they are compatible (step 705). According to particular embodiments, the compatibility is determined on the basis of the method described by reference to FIG. 4. Still according to particular embodiments, a list of pairs of compatible auto-setting algorithm and camera is built.

Next, results of the compatibility are provided to a user. For the sake of illustration, the pairs of compatible auto-setting algorithms and cameras may be displayed on a user interface, for example on a graphical user interface. After providing a user with compatibility results, the ability to select an auto-setting algorithm that is to be used with a camera is given to the user (step 715).

As suggested with the dashed arrow, a user may select an auto-setting algorithm that is to be used with a camera, for several cameras.

It is observed that there are numerous ways for providing compatibility results to a user and/or for enabling the user to select a camera and/or an auto-setting algorithm.

For instance, the names of the auto-setting algorithms that are compatible with a camera may be displayed once the camera is selected by a user. According to particular embodiments, the names of auto-setting algorithms which are not compatible with a selected camera may also be displayed but in a distinct way (e.g. in light grey), so that the user can understand that the corresponding auto-setting algorithms cannot be selected and used in relation with the selected camera. As another example, small images or characters may be displayed along with a camera to indicate whether a particular auto-setting algorithm is supported or not. The image/characters may be displayed in color when association is possible, and in greyscale when it is not.

Still for the sake of illustration, a list of cameras may be displayed so that a user may select one or more cameras and then, the auto-setting algorithms that are compatible with the selected camera(s) are displayed making it possible for the user to select one of them. Conversely, a list of auto-setting algorithms may be displayed so that a user may select one or more of them and then a list of cameras that are compatible with the selected camera(s) is displayed, enabling the user to select one of them.

Figure 8:
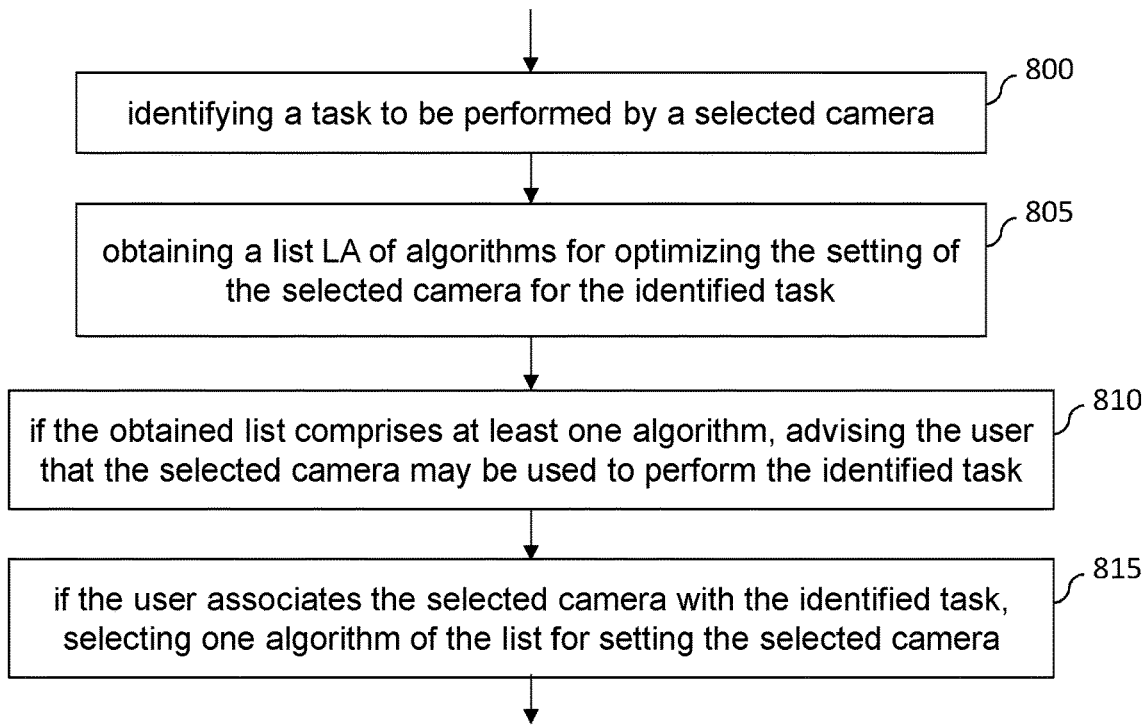
FIG. 8 is a block diagram illustrating a second example of steps of a method for assigning an auto-setting algorithm to camera.

FIG. 8 is a block diagram illustrating a second example of steps of a method for assigning an auto-setting algorithm to a camera.

According to the example illustrated in FIG. 8, a camera is selected and a task to be performed by the selected camera is identified prior to considering an auto-setting algorithm (step 800).

Next, a list of auto-setting algorithms that make it possible to perform the identified task and that are compatible with the selected camera is obtained (step 805). As described above, such a list may be built so as to comprise all the auto-setting algorithms that make it possible to perform the identified task and that required setting parameters belong to the set of setting parameter of the selected camera that are controllable though an API, as described by reference to FIGS. 1 and 2. The list of auto-setting algorithms may comprise algorithms having different combinations of required setting parameters. For example, the setting parameters of an algorithm of this list may be the gain and the shutter speed while the setting parameters of another algorithm of this list may be the gain, the shutter speed, and the aperture.

Next, if the list comprises at least one auto-setting algorithm, the user is advised that the selected camera may be used to perform the identified task (step 810). According to particular embodiments, an indication is displayed on a graphical user interface to inform the user that the selected camera is adapted for performing the identified task.

In addition, if the list comprises at least one auto-setting algorithm, the user is provided with the opportunity to associate the selected camera with the identified task. Upon such association by user, one auto-setting algorithm of the list is selected to be used for setting or for optimizing the setting of the selected camera (step 815).

If the list comprises several auto-setting algorithms, the opportunity to select one of these auto-setting algorithms may be given to the user. According to particular embodiments, these auto-setting algorithms are ordered to help the user to select the one that is the more likely to give the best results. As an example, the number of required setting parameters may be used as a criterion for ordering the auto-setting algorithms (the more setting parameters, the better). According to other embodiments, the auto-setting algorithm that is the most likely to give the best results is selected automatically.

It is noted that the method described by reference to FIG. 8 may be generalized and applied to a list of tasks.

It is also to be noted that a task may be considered as a proxy for selecting an auto-setting algorithm, making it possible to avoid any reference to auto-setting algorithms and to the compatibility between an auto-setting algorithm and a camera (i.e. only an indication of compatibility between a camera and a task or mission may be provided to a user).

One of the advantages of considering tasks or missions instead of auto-setting algorithms is that tasks or missions are more easily understandable by users. Indeed, users are generally only interested in assigning a task or a mission to a camera, whatever the selected auto-setting algorithm may be.

According to particular embodiments, a user interface enables users to associate cameras and tasks or missions while providing users with the opportunity to select a specific auto-setting algorithm through an additional configuration step. By doing so, some advanced users may have the benefit of selecting a specific auto-setting algorithm for a particular task or mission, whereas most users would simply let the system decide which auto-setting algorithm may be used for considered cameras and tasks or missions.

While the invention has been illustrated and described in detail in the drawings and foregoing description, such illustration and description are to be considered illustrative or exemplary and not restrictive, the invention being not restricted to the disclosed embodiment. Other variations on the disclosed embodiment can be understood and performed by those skilled in the art, in carrying out the claimed invention, from a study of the drawings, the disclosure and the appended claims.

Such variations may derive, in particular, from combining embodiments as set forth in the summary of the invention and/or in the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for improving settings of a camera, the method comprising:
   obtaining a first set of setting parameters that are adjustable by an auto-setting algorithm, the setting parameters of the first set being set as a function of a task to be performed based on images obtained from the camera;

obtaining a second set of setting parameters, the setting parameters of the second set being setting parameters of the camera, values of which are settable remotely from the camera;

determining, as a function of the first and second sets of setting parameters, whether the auto-setting algorithm and the camera are compatible to perform the task; and if the auto-setting algorithm and the camera are compatible to perform the task, executing the auto-setting algorithm to adjust values of setting parameters of the camera, wherein a first or second set of setting parameters is obtained for each auto-setting algorithm of a plurality of auto-setting algorithms or each camera of a plurality of cameras, respectively, wherein the compatibility of said auto-setting algorithms or cameras with at least one camera or auto-setting algorithm, respectively, is determined, the method further comprising:

displaying a list of items of information relating to the auto-setting algorithms or cameras, according to corresponding compatibility indications;

detecting selection by a user of an item of information displayed; and executing at least one auto-setting algorithm upon detection of a selection of an item of information displayed.

2. The method of claim 1, wherein determining, as a function of the first and second sets of setting parameters, whether the auto-setting algorithm and the camera are compatible to perform the task, comprises determining whether the first set of setting parameters is comprised within the second set of setting parameters.

3. The method of claim 1, wherein the setting parameters of the camera values of which are adjusted are the setting parameters of the first set of setting parameters.

4. The method of claim 1, further comprising obtaining an interface for interfacing with the camera, the interface being used to obtain the second set of setting parameters and to adjust the values of setting parameters of the camera.

5. The method of claim 1, wherein determining, as a function of the first and second sets of setting parameters, whether the auto-setting algorithm and the camera are compatible to perform the task, further comprises comparing a behaviour of the camera when values of setting parameters of the second set of setting parameters are changed with a variation model associated with the auto-setting algorithm.

6. The method of claim 5, wherein comparing the behaviour of the camera when values of setting parameters of the second set of setting parameters are changed with a variation model associated with the auto-setting algorithm, comprises determining a set of values for each setting parameter of the second set of parameters, the behaviour of the camera being estimated for each value of each set of values.

7. The method of claim 5, wherein the behaviour of the camera is determined as a function of features measured in images obtained from the camera, the measured features being determined as a function of the variation model associated with the auto-setting algorithm.

8. The method of claim 1, wherein a plurality of auto-setting algorithms are obtained, each auto-setting algorithm of the plurality of auto-setting algorithms making it possible to perform at least one task based on images obtained from the camera, wherein the compatibility of each auto-setting algorithm of the plurality of auto-setting algorithms with the camera is determined, the method further comprising:

displaying a list of items of information relating to the auto-setting algorithms, according to corresponding compatibility indications;

detecting selection by a user of an item of information relating to an auto-setting algorithm; and executing the auto-setting algorithm upon detection of a selection of an item of information.

9. The method of claim 8, wherein the list of items of information is a list of tasks that can be performed by the auto-setting algorithms of the plurality of auto-setting algorithms, the corresponding compatibility indications being indicative of whether at least one auto-setting algorithm that can perform the task is compatible with the camera.

10. The method of claim 1, wherein a second set of setting parameters is obtained for each of a plurality of cameras, wherein the compatibility of each camera of the plurality of cameras with the auto-setting algorithm is determined, the method further comprising:

displaying a list of items of information relating to cameras, according to corresponding compatibility indications;

detecting selection by a user of an item of information relating to a camera; and executing the auto-setting algorithm upon detection of a selection of an item of information relating to a camera.

11. The method of claim 10, wherein an item of information relating to a camera is a reference to a camera or a type of camera.

12. The method of claim 11, further comprising displaying an indication of the task to be performed, wherein the corresponding compatibility indications are indicative of whether the referenced camera or the type of camera can be used for the task to be performed, depending on the compatibility of the corresponding camera with the auto-setting algorithm.

13. A non-transitory computer-readable medium comprising computer readable instructions which, when run on a computer, causes the computer to carry out a method for improving settings of a camera, the method comprising:

obtaining a first set of setting parameters that are adjustable by an auto-setting algorithm, the setting parameters of the first set being set as a function of a task to be performed based on images obtained from the camera;

obtaining a second set of setting parameters, the setting parameters of the second set being setting parameters of the camera, values of which are settable remotely from the camera;

determining, as a function of the first and second sets of setting parameters, whether the auto-setting algorithm and the camera are compatible to perform the task; and if the auto-setting algorithm and the camera are compatible to perform the task, executing the auto-setting algorithm to adjust values of setting parameters of the camera; and wherein a first or second set of setting parameters is obtained for each auto-setting algorithm of a plurality of auto-setting algorithms or each camera of a plurality of cameras, respectively, wherein the compatibility of said auto-setting algorithms or cameras with at least one camera or auto-setting algorithm, respectively, is determined, the method further comprising:

displaying a list of items of information relating to the auto-setting algorithms or cameras, according to corresponding compatibility indications;

detecting selection by a user of an item of information displayed; and executing at least one auto-setting algorithm upon detection of a selection of an item of information displayed.

14. A device for improving settings of a remote camera, the device comprising a microprocessor configured for carrying out the steps of:
  obtaining a first set of setting parameters that are adjustable by an auto-setting algorithm, the setting parameters of the first set being set as a function of a task to be performed based on images obtained from the remote camera;
  obtaining a second set of setting parameters, the setting parameters of the second set being setting parameters of the remote camera, values of which are settable remotely from the remote camera;
  determining, as a function of the first and second sets of setting parameters, whether the auto-setting algorithm and the remote camera are compatible to perform the task; and
  if the auto-setting algorithm and the remote camera are compatible to perform the task, executing the auto-setting algorithm to adjust values of setting parameters of the remote camera,
  wherein the microprocessor is further configured so that a first or second set of setting parameters is obtained for each auto-setting algorithm of a plurality of auto-setting algorithms or each camera of a plurality of cameras, respectively, and so that the compatibility of said auto-setting algorithms or cameras with at least one camera or auto-setting algorithm, respectively, is determined, the microprocessor being further configured for carrying out the steps of:
    displaying a list of items of information relating to the auto-setting algorithms or cameras, according to corresponding compatibility indications;
    detecting selection by a user of an item of information displayed; and
    executing at least one auto-setting algorithm upon detection of a selection of an item of information displayed.

15. The device of claim 14, wherein the microprocessor is further configured so that determining, as a function of the first and second sets of setting parameters, whether the auto-setting algorithm and the remote camera are compatible to perform the task, comprises determining whether the first set of setting parameters is comprised within the second set of setting parameters.

16. The device of claim 14, wherein the microprocessor is further configured for carrying out a step of obtaining an interface for interfacing with the remote camera, the interface being used to obtain the second set of setting parameters and to adjust the values of setting parameters of the remote camera.

17. The device of claim 14, wherein the microprocessor is further configured so that determining, as a function of the first and second sets of setting parameters, whether the auto-setting algorithm and the remote camera are compatible to perform the task, further comprises comparing a behaviour of the remote camera when values of setting parameters of the second set of setting parameters are changed with a variation model associated with the auto-setting algorithm.

18. The device of claim 17, wherein the microprocessor is further configured so that comparing the behaviour of the remote camera when values of setting parameters of the second set of setting parameters are changed with a variation model associated with the auto-setting algorithm, comprises determining a set of values for each setting parameter of the second set of parameters, the behaviour of the remote camera being estimated for each value of each set of values.

19. The device of claim 14, wherein the microprocessor is further configured so that a plurality of auto-setting algorithms are obtained, each auto-setting algorithm of the plurality of auto-setting algorithms making it possible to perform at least one task based on images obtained from the remote camera, wherein the microprocessor is further configured so that the compatibility of each auto-setting algorithm of the plurality of auto-setting algorithms with the remote camera is determined, the microprocessor being further configured for carrying out the steps of:
  displaying a list of items of information relating to the auto-setting algorithms, according to corresponding compatibility indications;
  detecting selection by a user of an item of information relating to an auto-setting algorithm; and
  executing the auto-setting algorithm upon detection of a selection of an item of information.

20. The device of claim 14, wherein the microprocessor is further configured so that a second set of setting parameters is obtained for each of a plurality of remote cameras and so that the compatibility of each remote camera of the plurality of remote cameras with the auto-setting algorithm is determined, the microprocessor being further configured for carrying out the steps of:
  displaying a list of items of information relating to remote cameras, according to corresponding compatibility indications;
  detecting selection by a user of an item of information relating to a remote camera; and
  executing the auto-setting algorithm upon detection of a selection of an item of information relating to a remote camera.

* * * * *